(12) United States Patent
Jones et al.

(10) Patent No.: US 9,040,125 B2
(45) Date of Patent: May 26, 2015

(54) COVALENTLY BOUND MONOLAYER FOR A PROTECTIVE CARBON OVERCOAT

(71) Applicant: SEAGATE TECHNOLOGY LLC, Cupertino, CA (US)

(72) Inventors: Paul M. Jones, St. John, VI (US); Xiaoping Yan, Wexford, PA (US); Lei Li, Wexford, PA (US); James Dillon Kiely, Edina, MN (US); Christopher Loren Platt, Fremont, CA (US); Michael J. Stirniman, Fremont, CA (US); Jiping Yang, San Jose, CA (US); Yiao-Tee Hsia, Pleasanton, CA (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/949,314

(22) Filed: Jul. 24, 2013

(65) Prior Publication Data

US 2013/0337194 A1    Dec. 19, 2013

Related U.S. Application Data

(62) Division of application No. 12/711,148, filed on Feb. 23, 2010, now Pat. No. 8,518,563.

(51) Int. Cl.
*G11B 5/84* (2006.01)
*G11B 5/725* (2006.01)
*G11B 5/82* (2006.01)
*G11B 5/60* (2006.01)

(52) U.S. Cl.
CPC .......... *G11B 5/8408* (2013.01); *G11B 5/6011* (2013.01); *G11B 5/725* (2013.01); *G11B 5/82* (2013.01)

(58) Field of Classification Search
None
See application file for complete search history.

(56) References Cited

U.S. PATENT DOCUMENTS

| | | | |
|---|---|---|---|
| 5,686,548 A | | 11/1997 | Grainger |
| 5,989,625 A | * | 11/1999 | Hilgers et al. ................ 427/131 |
| 6,006,694 A | * | 12/1999 | DeOrnellas et al. ........ 118/723 I |
| 6,586,069 B2 | | 7/2003 | Dykes |
| 6,627,302 B1 | * | 9/2003 | Tang et al. .................... 428/212 |
| 6,822,833 B2 | | 11/2004 | Yang |
| 7,147,943 B2 | * | 12/2006 | Ono et al. ..................... 428/835 |
| 7,153,597 B2 | | 12/2006 | Yang |
| 2002/0031615 A1 | | 3/2002 | Dykes |
| 2004/0161578 A1 | | 8/2004 | Chour |
| 2004/0201926 A1 | | 10/2004 | Hancer |
| 2005/0031907 A1 | * | 2/2005 | Matsuyama ........... 428/694 BF |
| 2006/0177705 A1 | | 8/2006 | Ahner |

(Continued)

OTHER PUBLICATIONS

Challener et al., "Heat-Assisted Magnetic Recording by a Near-Field Transducer with Efficient Optical Energy Transfer", Nature Photonics Advance Online Publication, published online Mar. 22, 2009, 5 pgs.

*Primary Examiner* — Joseph Miller, Jr.
(74) *Attorney, Agent, or Firm* — Mueting, Raasch & Gebhardt, P.A.

(57) ABSTRACT

A magnetic data storage medium may include a substrate, a magnetic recording layer, a protective carbon overcoat, and a monolayer covalently bound to carbon atoms adjacent a surface of the protective carbon overcoat. According to this aspect of the disclosure, the monolayer comprises at least one of hydrogen, fluorine, nitrogen, oxygen, and a fluoro-organic molecule. In some embodiments, a surface of a read and recording head may also include a monolayer covalently bound to carbon atoms of a protective carbon overcoat.

17 Claims, 5 Drawing Sheets

(56) References Cited

U.S. PATENT DOCUMENTS

| | | |
|---|---|---|
| 2007/0042154 A1 | 2/2007 | Hancer |
| 2007/0127158 A1 | 6/2007 | Tran |
| 2008/0024923 A1 | 1/2008 | Tomimoto |
| 2009/0147403 A1 | 6/2009 | Araki |

* cited by examiner

COVALENTLY BOUND MONOLAYER FOR A PROTECTIVE CARBON OVERCOAT

This is a divisional application of U.S. patent application Ser. No. 12/711,148, filed Feb. 23, 2010, the disclosure of which is incorporated by reference herein in its entirety.

SUMMARY

In one aspect, the present disclosure is directed to an article including a protective carbon overcoat and a monolayer covalently bound to carbon atoms of the protective carbon overcoat. According to this aspect of the disclosure, the monolayer comprises at least one of hydrogen, fluorine, nitrogen, oxygen, or a fluoro-organic molecule.

The details of one or more embodiments of the invention are set forth in the accompanying drawings and the description below. Other features, objects, and advantages of the invention will be apparent from the description and drawings, and from the claims.

DETAILED DESCRIPTION

Some magnetic data storage media include a carbon protective overcoat formed on the magnetic recording layer and a lubricant layer deposited on the carbon protective overcoat. In some embodiments, the lubricant layer may include a thickness between approximately 0.5 nanometers (nm) and approximately 2 nm and provides a coefficient of friction of approximately 0.1 between the surface of the carbon protective overcoat and a surface of a recording and read head. In some cases, this thickness may be greater than desired.

For example, it may be desirable to decrease the flying height of a magnetic recording and read head over the magnetic storage medium in future magnetic data storage devices to an in-contact or a nearly in-contact flying height in order to improve a signal-to-noise ratio of the system. Reducing the flying height of the recording and read head may reduce the distance between the magnetic transducer of the recording and read head and the magnetic domains of the magnetic storage medium, and thus may increase the magnetic field strength detected by the read head for the same magnetization of the magnetic domains of the magnetic storage medium. Use of some lubricants in the head-media system may result in excessive friction between the recording and read head and the magnetic storage medium at these low flying heights and may lead to high wear rates, resulting in damage to and the eventual failure of a surface of the magnetic storage medium, a surface of the recording and read head, or both.

One option for reducing the head-media spacing is to forgo use of a lubricant layer and leave an uncoated protective carbon overcoat as the contact surface between the magnetic storage medium and the recording and read head. However, with no additional coating, such an interface results in a coefficient of friction that ranges from about 0.2 to about 0.5. Such a value for the coefficient of friction may lead to excessive wear at the interface of the recording and read head and the magnetic storage medium, or even premature failure of the magnetic storage medium, recording and read head, or both.

In general, the present disclosure is directed to a magnetic data storage medium and, optionally, a magnetic recording and read head, including a protective carbon overcoat surface covalently bound to a monolayer of molecules, which may reduce a coefficient of friction of the surface compared to an untreated carbon protective overcoat surface. Additionally, the monolayer may facilitate a reduction of a flying height of the recording and read head over a surface of the magnetic data storage medium. The covalently-bound molecules may include, for example, hydrogen, fluorine, nitrogen, oxygen, a fluoro-organic molecule, or the like. The disclosure also presents a method for directly depositing the monolayer of molecules onto the surface of carbon protective overcoat. Carbon overcoat surfaces treated in this manner may have a lower or even significantly lower coefficient of friction and a lower wear rate compared to uncoated surfaces or surfaces coated with a separate lubricant layer.

Figure 1:
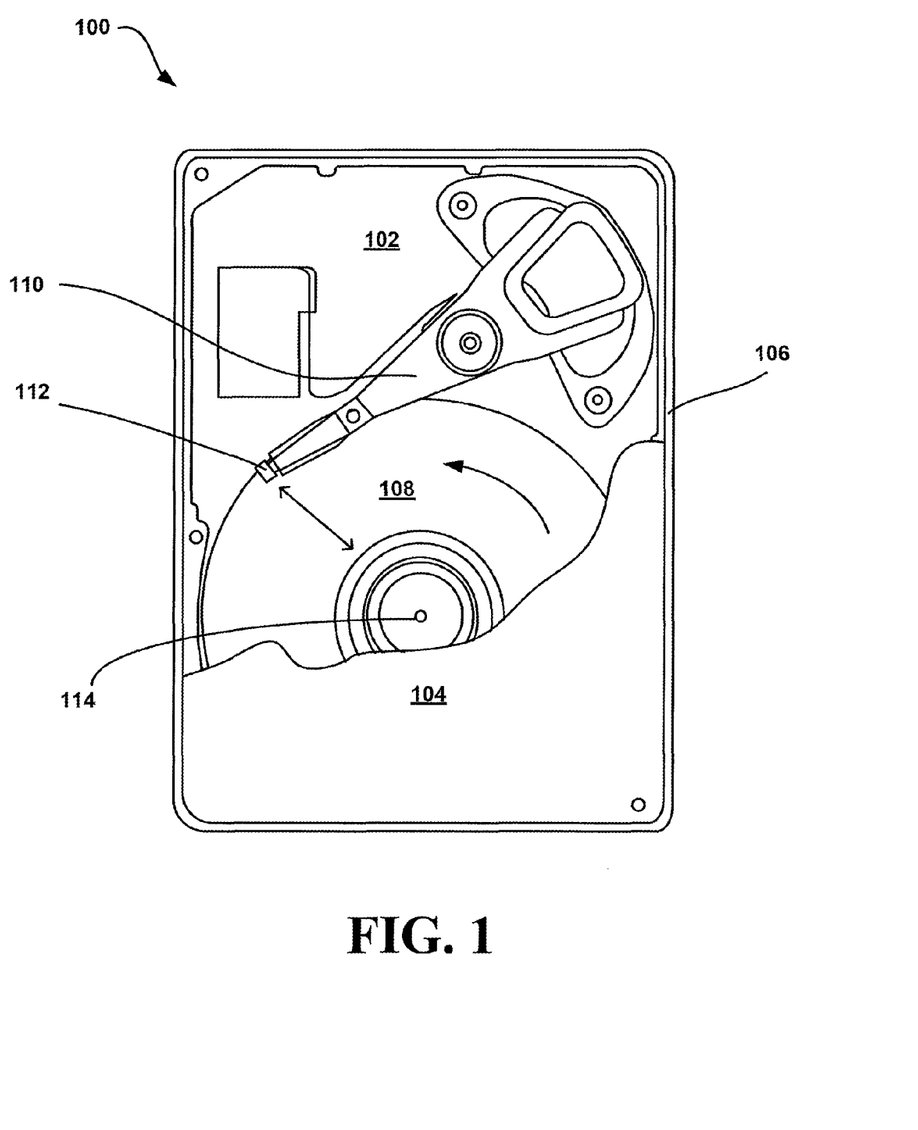
FIG. 1 is a schematic diagram of a hard disc drive.

FIG. 1 illustrates an exemplary magnetic disc drive 100, which may include a magnetic data storage medium 108 having an ultra-low friction overcoat according to one aspect of the present disclosure. Disc drive 100 includes base 102 and top cover 104, shown partially cut away. Base 102 combines with top cover 104 to form the housing 106 of disc drive 100. Disc drive 100 also includes one or more rotatable magnetic data storage media 108. Magnetic storage media 108 are attached to spindle 114, which operates to rotate media 108 about a central axis. Magnetic recording and read head 112 is adjacent to magnetic storage media 108. Actuator arm 110 carries magnetic recording and read head 112 for communication with each of the magnetic storage media 108.

Magnetic storage media 108 store information as magnetically oriented bits in a magnetic recording layer. Magnetic recording and read head 112 includes a recording (write) head that generates magnetic fields sufficient to magnetize discrete domains of the magnetic film on magnetic storage media 108. These discrete domains of the magnetic film each represent a bit of data, with one magnetic orientation representing a "0" and a substantially opposite magnetic orientation representing a "1." Magnetic recording and read head 112 also includes a read head that is capable of detecting the magnetic fields of the discrete magnetic domains of the magnetic film.

According to one aspect of the present disclosure, magnetic storage media 108 may not include a lubricant layer deposited on a surface of a protective carbon overcoat. Instead, magnetic storage media 108 may include a monolayer of molecules or atoms covalently bound to carbon atoms adjacent a surface of the protective carbon overcoat. The monolayer of molecules or atoms may reduce a coefficient of friction of the surface compared to an untreated carbon protective overcoat surface, and may facilitate a reduction in the flying height of recording and read head 112 over the surface of a magnetic storage media 108.

Figure 2:
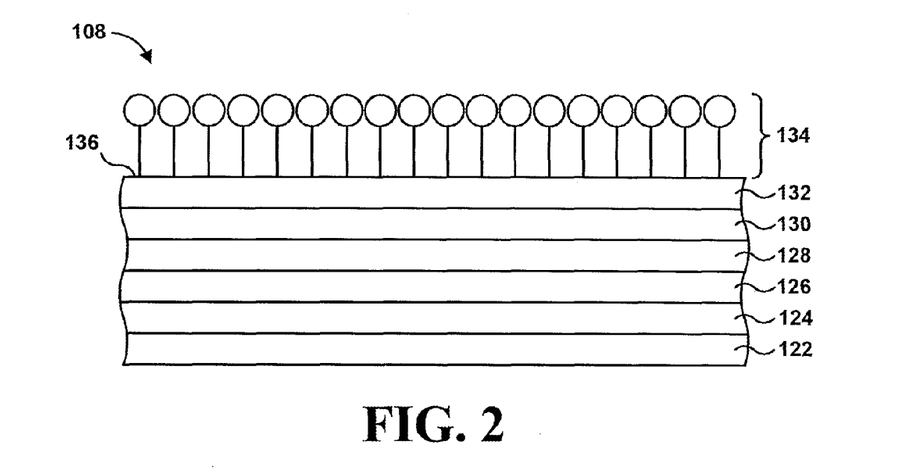
FIG. 2 is a simplified cross-sectional diagram of an example magnetic storage medium.

FIG. 2 is a simplified cross-sectional diagram of an exemplary magnetic storage medium 108. For purposes of illustration, magnetic storage medium 108 is a perpendicular recording medium. However, in other examples, the monolayer disclosed herein may be utilized with another type of recording medium, such as, for example, a longitudinal recording medium, a heat-assisted magnetic recording (HAMR) medium, a wire assisted magnetic recording (WAMR) medium, or the like. In embodiment illustrated in FIG. 2, magnetic storage medium 108 includes a substrate 122, soft underlayer (SUL) 124, a first interlayer 126, a second interlayer 128, a magnetic recording layer 130, a protective carbon overcoat 132, and a monolayer 134 covalently bound to carbon atoms adjacent an upper surface 136 of protective carbon overcoat 132.

Substrate 120 may include any material that is suitable to be used in magnetic recording media, including, for example, Al, NiP plated Al, glass, ceramic glass, or the like.

Although not shown in FIG. 2, in some embodiments, at least one additional underlayer may be present immediately on top of substrate 120. The additional underlayer may be amorphous and provides adhesion to the substrate and low surface roughness.

A soft underlayer (SUL) 124 is formed on substrate 120 (or the additional underlayer, if one is present). SUL 124 may be any soft magnetic material with sufficient saturation magnetization ($B_s$) and low anisotropy ($H_k$). For example, SUL 124 may be an amorphous soft magnetic material such as Ni; Co; Fe; an Fe-containing alloy such as NiFe (Permalloy), FeSiAl, FeSiAlN, or the like; a Co-containing allow such as CoZr, CoZrCr, CoZrNb, or the like; or a CoFe-containing alloy such as CoFeZrNb, CoFe, FeCoB, FeCoC, or the like.

First interlayer 126 and second interlayer 128 may be used to establish an HCP (hexagonal close packed) crystalline orientation that induces HCP (0002) growth of the magnetic recording layer 130, with a magnetic easy axis perpendicular to the plane of magnetic storage medium 108.

Magnetic recording layer 130 may include Co alloys. For example, the Co alloy may include Co in combination with at least one of Cr, Ni, Pt, Ta, B, Nb, O, Ti, Si, Mo, Cu, Ag, Ge, or Fe. Magnetic recording layer 130 may also include a Fe—Pt alloy, a Sm—Co alloy, or the like. In some embodiments, magnetic recording layer 130 may include a non-magnetic oxide, such as $SiO_2$, $TiO_2$ CoO, $Cr_2O_3$, $Ta_2O_5$, or the like, which separates the magnetic grains.

A protective carbon overcoat 132 may be formed on magnetic recording layer 130. Protective carbon overcoat 132 may include, for example, diamond like carbon, which has a crystal lattice similar to diamond, or an amorphous carbon layer. In some embodiments, an upper surface 136 of protective carbon overcoat 132 may comprise a (100) crystal plane. In other embodiments, upper surface 136 may comprise another crystal plane.

Carbon atoms adjacent upper surface 136 of protective carbon overcoat 132 may be covalently bound to respective molecules of monolayer 134. In the present disclosure, adjacent to upper surface 136 is defined as the plane or planes of atoms exposed at upper surface 136 and available to bond to a molecule or atom in monolayer 134. Monolayer 134 may comprise molecules or atoms that reduce a coefficient of friction with another surface compared to a coefficient of friction between an untreated upper surface 136 of protective carbon overcoat 132 and the other surface.

In some embodiments, monolayer 134 may eliminate the need for a separate lubricant layer, which in some systems is formed on upper surface 136 of protective carbon overcoat 132. Monolayer 134 may provide upper surface 136 with sufficiently low friction that a separate lubricant layer is not required on upper surface 136.

Because a separate lubricant layer is not required, use of monolayer 134 may reduce a flying height of a recording and read head 112 over magnetic storage medium 108. Monolayer 134 may have a thickness between approximately 0.9 Å and approximately 5 Å. This may be thinner than the thickness of a separate lubricant layer applied to upper surface 136 of protective carbon overcoat 132. The relative thinness of monolayer 134 compared to a separate lubricant layer may facilitate a lower flying height of recording and read head 112 over upper surface 136 of protective carbon overcoat 134.

A lower flying height of recording and read head 112 over upper surface 136 of protective carbon overcoat 134 may increase a signal-to-noise ratio (SNR) of magnetic disc drive 100. For example, reducing the flying height of recording and read head 112 may reduce the distance between the magnetic transducer of the recording and read head 112 and the magnetic domains of the magnetic storage medium 108. This may increase the magnetic field strength detected by the recording and read head 112 for the same magnetization of the magnetic domains of the magnetic storage medium 108. The increased magnetic field strength may result in read head 112 generating an increased signal, and an increased signal-to-noise ratio.

Similarly, a decreased flying height of recording and read head 112 may increase the recording performance of magnetic disc drive 100. To record information to magnetic storage medium 108, a recording transducer in recording and read head 112 may generate a magnetic field with a specific orientation, which induces a magnetic orientation in domains within magnetic recording layer 130. By reducing the flying height of recording and read head 112, spacing between the recording transducer in recording and read head 112 and magnetic recording layer 130 may be reduced. This may increase the strength of the magnetic field at the magnetic recording layer 130 (for the same magnetic field generated by the recording transducer). This may allow magnetic recording layer 130 to comprise materials with increased coercivity, which may increase stability of the magnetic domains, or may allow other improvements to the recording system, such as use of other recording transducers.

In some embodiments, monolayer 134 may comprise a plurality of molecules each covalently bound to a respective carbon atom adjacent the upper surface 136 of protective carbon overcoat 132. For example, monolayer 134 may include a plurality of fluoro-organic molecules, e.g., —CF, —$CF_2$, —$CF_3$, —$CF_2$—$CF_3$, —$CF_2$—$CF_2$—$CF_3$, or —$CF_2$—$CF_2$—$CF_2$—$CF_3$, each covalently bound to a respective carbon atom adjacent upper surface 136.

In other embodiments, monolayer 134 may comprise a plurality of single atoms each covalently bound to a respective carbon atom adjacent the upper surface 136 of protective carbon overcoat 132. For example, monolayer 134 may comprise at least one of hydrogen, nitrogen, oxygen, or fluorine. In some embodiments, a monolayer 134 comprising single atoms covalently bound to protective carbon overcoat 132 may be thinner than a monolayer 134 comprising molecules bound to protective carbon overcoat 132. In this way, a monolayer 134 including single atoms covalently bound to protective carbon overcoat 132 may facilitate a smaller flying height than a monolayer 134 including molecules covalently bound to protective carbon overcoat 132.

Figure 4:
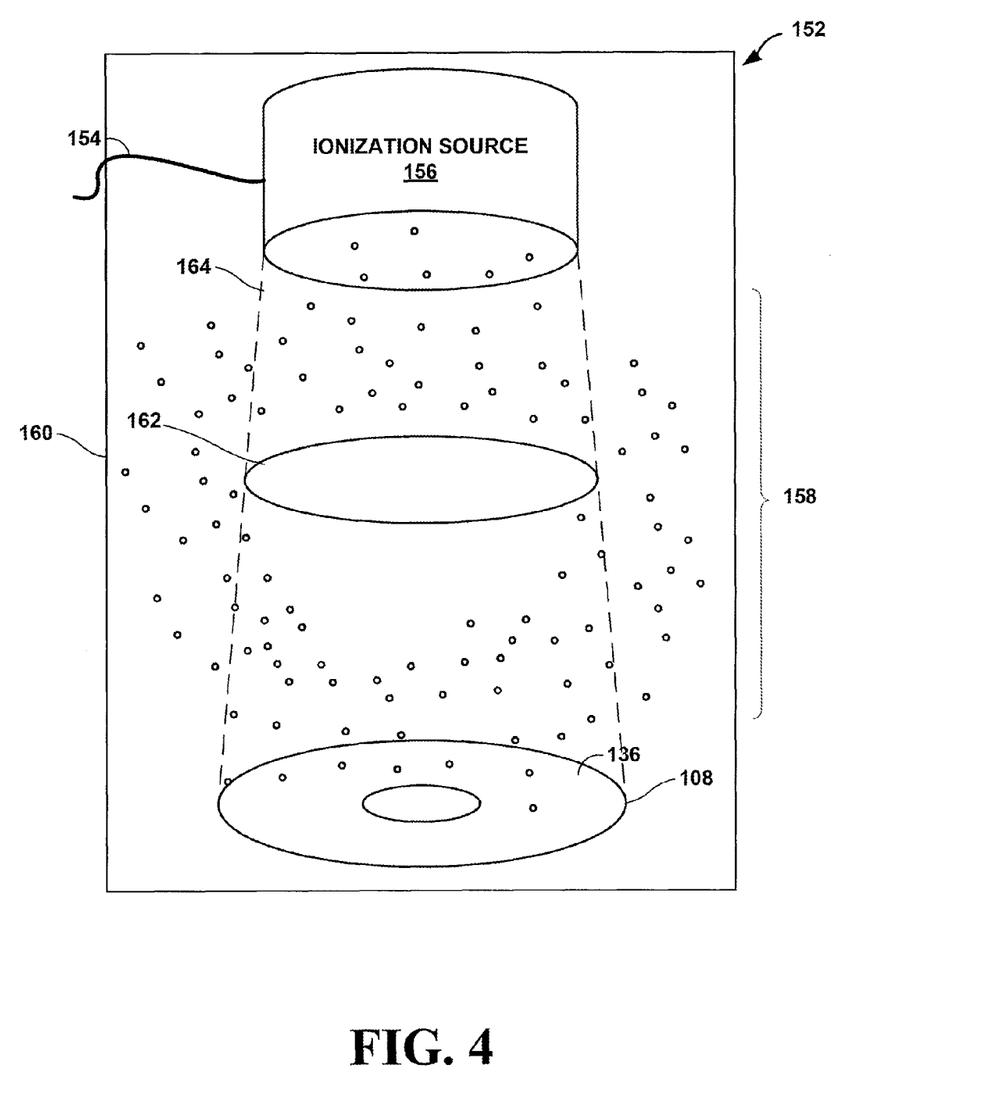
FIG. 4 is a block diagram illustrating an example system for depositing a monolayer onto a surface of a magnetic storage medium.
Figure 5:
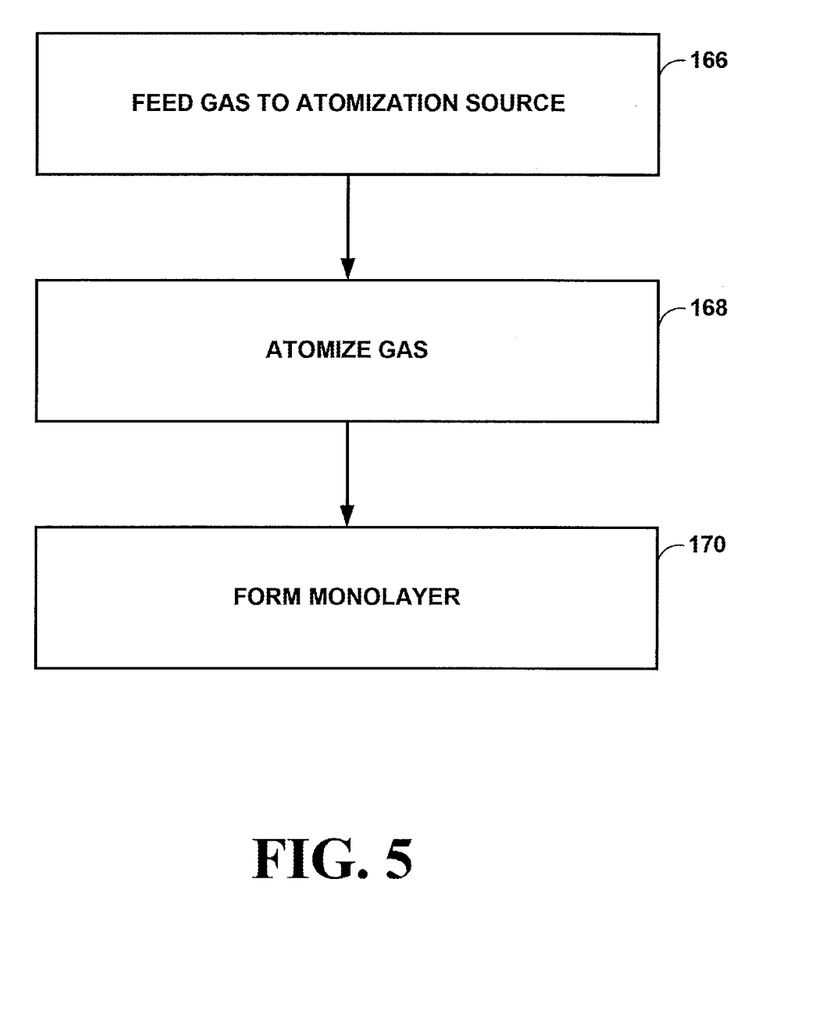
FIG. 5 is a flowchart illustrating an example process for depositing a monolayer onto a surface of a magnetic storage medium.

Monolayer 134 may be deposited on upper surface 136 in a vacuum chamber using a plasma source, such as, for example, a radio-frequency inductive plasma source, a radio-frequency capacitive plasma source, a DC arc plasma source, a hollow cathode plasma source, microwave plasma source or an electron cyclotron resonance (ECR) plasma source, as described in further detail with respect to FIGS. 4 and 5.

Monolayer 134 preferably substantially fully covers upper surface 136 of protective carbon overcoat 132. In other words, preferably substantially all of the carbon atoms adjacent upper surface 136 are covalently bound to a molecule or atom in monolayer 134. In some embodiments, upper surface 136 may comprise approximately $10^{15}/cm^2$ surface bonding sites (e.g., $10^{15}$ exposed carbon atoms adjacent to upper surface 136 and available for bonding to atoms or molecules in monolayer 134). One measure of the coverage coverage of upper surface 136 is the coverage density, which is defined as nanograms (ng) of monolayer 134 per centimeter squared ($cm^2$) of upper surface 136. The coverage density may vary depending on the atom or molecule in monolayer 134. In some embodiments, monolayer 134 may comprise a coverage density of less than approximately 400 nanograms per $cm^2$ ($ng/cm^2$). In other embodiments, monolayer 134 may comprise a coverage density of between approximately 200 $ng/cm^2$ and approximately 400 $ng/cm^2$. In some examples, a monolayer 134 comprising, for example, hydrogen atoms may have a lower coverage density than a monolayer 134 comprising a fluoro-organic molecule, such as —$CF_2$—$CF_2$—$CF_2$—$CF_3$.

In some embodiments, not all the carbon atoms adjacent to upper surface 136 may be covalently bonded to a molecule in monolayer 134. For example, when monolayer 134 comprises a chain molecule, such as —$CF_2$—$CF_2$—$CF_2$—$CF_3$ or the like, the number of carbon atoms that are covalently bonded to a —$CF_2$—$CF_2$—$CF_2$—$CF_3$ may be less than $10^{15}/cm^2$. For example, only approximately $5 \times 10^7/cm^2$ carbon atoms may be covalently bound to a —$CF_2$—$CF_2$—$CF_2$—$CF_3$, and monolayer 134 may still effectively reduce friction of upper surface 136 compared an uncoated upper surface 136 or a separate lubricant layer. Accordingly, in some embodiments, between approximately 50 percent and 100 percent of carbon atoms adjacent to upper surface 136 may be bound to an atom or molecule in monolayer 134. The desired surface density of covalently bound surface sites may depend on the atom or molecule in monolayer 134. For example, a surface density of covalently bound surface sites of —$CF_2$—$CF_3$ may be less than a surface density of covalently bound surface sites of —H, —F, or the like. Similarly, a surface density of covalently bound surface sites of —$CF_2$—$CF_2$—$CF_3$ may be less than a surface density of covalently bound surface sites of —$CF_2$—$CF_3$.

In some embodiments, such as, for example, when monolayer 134 comprises hydrogen, monolayer 134 may be thermally stable up to approximately 900° C. Additionally or alternatively, monolayer 134 may be substantially non-wetting, forming a water contact angle of approximately 95°, and may have relatively low chemical reactivity.

Figure 3:
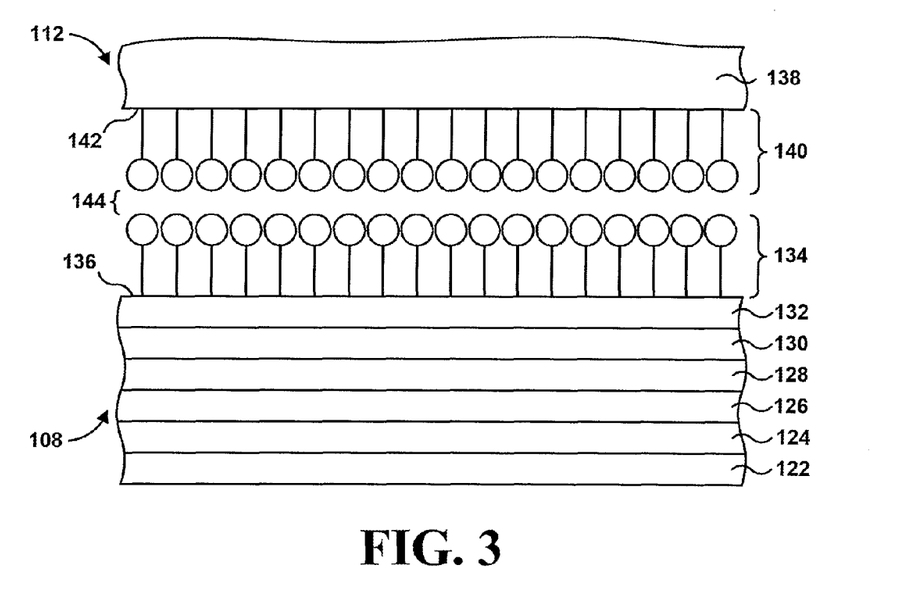
FIG. 3 is a block diagram illustrating a portion of system including a portion of an example read/write head and a portion of an example magnetic storage medium.

Although is some embodiments only upper surface 136 of magnetic storage medium 108 is covalently bound to monolayer 134, in other embodiments, a surface of recording and read head 112 may also be covalently bound to a monolayer. FIG. 3 is a block diagram illustrating a portion of such a system including a portion of an example recording and read head 112 and a portion of an example magnetic storage medium 108. Upper surface 136 of magnetic storage medium 108 and lower surface 142 of recording and read head 112 are covalently bound to a first monolayer 134 and a second monolayer 140, respectively.

Similar to magnetic storage medium 108, recording and read head 112 may include a protective carbon layer 138, which defines lower surface 142. Protective carbon layer 138 may form a surface of at least an advanced air bearing (AAB) slider portion of recording and read head 112. Protective carbon overcoat 138 may include, for example, diamond like carbon or an amorphous carbon layer. In some embodiments, lower surface 142 of protective carbon overcoat 138 may comprise a (100) crystal plane. In other embodiments, lower surface 142 may comprise another crystal plane.

Carbon atoms adjacent lower surface 142 of protective carbon overcoat 138 may be covalently bound to respective molecules of second monolayer 140. In the present disclosure, adjacent to lower surface 142 is defined as the plane or planes of atoms exposed at lower surface 142 and available to bond to a molecule or atom in second monolayer 140. Second monolayer 140 may comprise molecules or atoms that reduce a coefficient of friction with another surface (e.g., upper surface 136 of first protective carbon overcoat 132) compared to a coefficient of friction between an untreated lower surface 142 and the other surface.

Second monolayer 140 may have a thickness between approximately 0.9 Å and approximately 5 Å. The thickness of second monolayer 140 may facilitate a low flying height of recording and read head 112 over upper surface 136 of protective carbon overcoat 134.

In some embodiments, second monolayer 140 may comprise a plurality of molecules each covalently bound to a respective carbon atom adjacent upper surface 142 of protective carbon overcoat 138. For example, second monolayer 140 may include a plurality of fluoro-organic molecules each covalently bound to a respective carbon atom adjacent lower surface 142.

In other embodiments, second monolayer 138 may comprise a plurality of single atoms each covalently bound to a respective carbon atom adjacent lower surface 142 of protective carbon overcoat 138. For example, second monolayer 140 may comprise at least one of hydrogen, nitrogen, oxygen, or fluorine. In some embodiments, a second monolayer 140 comprising single atoms covalently bound to protective carbon overcoat 138 may be thinner than a second monolayer 140 comprising molecules bound to protective carbon overcoat 138. In this way, a second monolayer 140 including single atoms covalently bound to protective carbon overcoat 138 may facilitate a smaller flying height than a second monolayer 140 including molecules covalently bound to protective carbon overcoat 138.

In some embodiments, second monolayer 140 may include the same species (atom or molecule) as first monolayer 134. In other embodiments, second monolayer 140 may include a different species (atom or molecule) than first monolayer 134.

Second monolayer 140 may be deposited on lower surface 142 in a vacuum chamber using a plasma source, such as, for example, a radio-frequency inductive plasma source, a radio-frequency capacitive plasma source, a DC arc plasma source, a hollow cathode plasma source, microwave plasma source or an electron cyclotron resonance (ECR) plasma source, as described in further detail below with respect to FIGS. 4 and 5.

Second monolayer 140 preferably substantially fully covers lower surface 138 of protective carbon overcoat 138. In other words, substantially all of the carbon atoms adjacent lower surface 138 are preferably covalently bound to a molecule or atom in second monolayer 140.

Use of second monolayer 140 may further decrease friction between upper surface 136 and lower surface 142 compared to an uncoated lower surface 142 and a coated upper surface 136 or an uncoated lower surface 142 and an uncoated upper surface 136. For example, the coefficient of friction between upper surface 136 covalently bound to first monolayer 134 and lower surface 142 covalently bound to second monolayer 140 may be less than approximately 0.02. In some embodiments, the coefficient of friction between upper surface 136 covalently bound to first monolayer 134 and lower surface 142 covalently bound to second monolayer 140 may be less than approximately 0.002, or even less than approximately 0.0002. A low coefficient of friction may reduce a wear rate of upper surface 136, lower surface 142, or both, and may extend a lifetime of recording and read head 112 and/or magnetic storage medium 108.

FIG. 4 is a block diagram illustrating an example system for depositing a monolayer onto a surface of a magnetic storage medium or a recording and read head. For purposes of illustration, FIG. 4 will be described with concurrent reference to FIG. 5, which is a flowchart illustrating an example process for depositing a monolayer onto a surface of a magnetic storage medium or a recording and read head.

The deposition system 152 illustrated in FIG. 4 includes a vacuum chamber 160, an ionization source 156, and a gas input line 154. Positioned within vacuum chamber 160 is a magnetic storage medium 108, which may be similar to magnetic storage medium 108 described with respect to FIG. 2. Deposition system 152 also optionally includes a shield 162. In some embodiments, vacuum chamber 160 may be contiguous with or connected to a chamber in which protective carbon overcoat 132 is deposited on magnetic recording layer 130, in order to reduce or minimize contamination of upper surface 136 with unwanted chemical species. Vacuum chamber 160, and more particularly magnetic storage medium 108, may be maintained at or near room temperature (e.g., approximately 25° C.) to encourage proper surface chemistry.

As shown in FIG. 5, during the deposition process, an input gas is injected into the ionization source 156 in vacuum chamber 160 via gas input line 154 (162). The input gas may include the species to be covalently bound to upper surface 136 of magnetic storage medium 108, e.g., $F_2$, $H_2$, $N_2$, $O_2$, a fluoro-organic molecule, or the like. In some embodiments, the input gas may also include a carrier gas, such as, for example, He or Ar. The input gas may be at a low pressure, e.g., on the order of milliTorrs, and may have a flow rate of between approximately 1 standard cubic centimeter per minute (SCCM) and approximately 10 SCCM. The precise pressure and flow rate of the input gas may be selected to produce the desired coverage of upper surface 136 by monolayer 134 (FIG. 2) and to minimize the implantation of the species forming monolayer 134 in protective carbon overcoat 132. The operating parameter may also depend on the type of plasma source (e.g., a radio-frequency inductive plasma source, a radio-frequency capacitive plasma source, a DC arc plasma source, a hollow cathode plasma source, microwave plasma source or an electron cyclotron resonance (ECR) plasma source) and the geometry of the source.

In some embodiments, shield 162, which may be a thin metal plate, is placed between ionization source 156 and magnetic storage medium 108 to block direct bombardment of protective carbon overcoat 132 by ions 158. This may reduce the momentum with which ions 158 approach overcoat 132, and reduces or substantially eliminates implantation of ions 158 in protective carbon overcoat 132. The size and position of shield 162 may depend on the size and position of ionization source 156 relative to magnetic storage medium 108. In some embodiments, the size and position of shield 162 may be selected such that when viewed from a point on upper surface 136 of magnetic storage medium 108 a solid angle 164 of ionization source 156 is covered. Additionally or alternatively, the flow rate and pressure of the input gas may be selected such that ions 158 formed by the ionization source 156 approach upper surface 136 with low momentum (i.e., velocity), which may minimize implantation of the ions 158 in protective carbon overcoat 132.

Ionization source 156 produces ions 158, which are the species that form monolayer 134 (164). Ionization source 156 may comprise, for example, a radio-frequency inductive plasma source, a radio-frequency capacitive plasma source, a DC arc plasma source, a hollow cathode plasma source, microwave plasma source or an electron cyclotron resonance (ECR) plasma source. The beam current of ionization source 156 may be between approximately 10 milliamps (mA) and approximately 100 (mA) and the beam voltage may be between approximately 100 electron volts (eV) and approximately 2,000 eV. The particular beam current and beam voltage may be selected to increase formation of the desired atoms 158 and/or reduce formation of unwanted species.

Ions 158 approach upper surface 136 of magnetic storage medium 108 and covalently bond to carbon atoms adjacent upper surface 136 to form monolayer 134 (166). Ions 158 preferably approach upper surface 136 at a low velocity (with little momentum) to reduce the probability of implantation of ions 158 in magnetic storage medium 108 or damage to upper surface 136 and increase the probability that ions 158 will react with carbon atoms adjacent upper surface 136 to form covalently bound monolayer 134. As described above, ionization source 156 is preferably fed sufficient input gas to form sufficient ions 158 to substantially fully cover upper surface 136, i.e., substantially every carbon atom adjacent upper surface is bound to an atom or molecule of monolayer 134.

EXAMPLES

Examples 1-3

Figure 6:
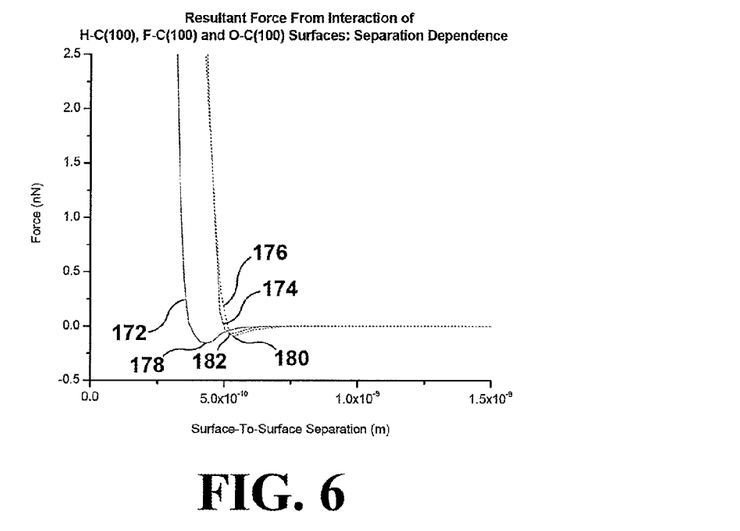
FIG. 6 is a graph of force versus separation of a first carbon(100)-hydrogen surface and a second carbon(100)-hydrogen surface.

FIG. 6 is an example of a graph of predicted force versus separation distance of a first surface and a second surface. In FIG. 6, three curves are shown. Curve 172 illustrates a predicted force versus separation distance for a first C(100)-H surface and a second C(100)-H surface. Curve 174 illustrates a predicted force versus separation distance for a first C(100)-F surface and a second C(100)-F surface. Curve 176 illustrates a predicted force versus separation distance for a first C(100)-O surface and a second C(100)-O surface. Each of the curves shows a potential well (attractive (negative) force) at between about 4 Å and about 6 Å. The potential well 178 is largest and occurs at the smallest separation distance (about 4 Å) for the C(100)-H surfaces. The potential wells 180, 182 for the C(100)-F and C(100)-0 surfaces, respectively, are smaller in magnitude than potential well 178 and occur at a greater separation distance (about 5.5 Å).

The predicted force curves also show a large repulsive, i.e., positive force, occurring at a smaller separation distance that the potential well. For example, the C(100)-H surfaces show a large repulsive wall at about 3.8 Å. The C(100)-F and C(100)-O surface show a large repulsive wall at about 5 Å. This may indicate that C(100)-H surface may allow smaller flying heights, and thus facilitate a higher SNR, than C(100)-F or C(100)-0 surfaces.

Example 4

Figure 7:
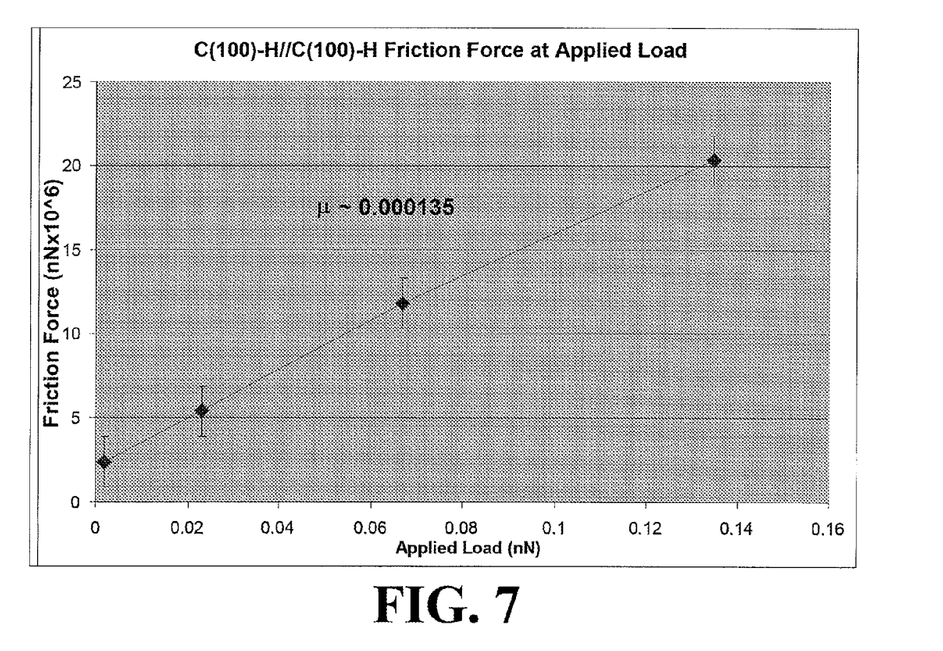
FIG. 7 is a graph of friction force versus applied load for a first carbon(100)-hydrogen surface and a second carbon (100)-hydrogen surface.

FIG. 7 is a graph of friction force versus applied load for a first C(100)-H surface and a second C(100)-H surface. By using the calculated friction force and the known applied load, the coefficient of friction for the two surfaces may be calculated. As FIG. 7 shows, the coefficient of friction as calculated from a four point linear regression was found to be about 0.000135. Note that a 0.14 (nano-Newton) nN load gives about a 100 mega-Pascal (MPa) contact pressure.

Various embodiments of the invention have been described. These and other embodiments are within the scope of the following claims.

The invention claimed is:

1. A method comprising:
   injecting one or more gasses into an ionization source, wherein the one or more gasses are selected from: hydrogen ($H_2$), nitrogen ($N_2$), oxygen ($O_2$), or combinations thereof;
   ionizing the one or more gasses in the ionization source to form ions of the one or more gasses; and
   depositing a monolayer on a surface of a protective carbon overcoat of a magnetic data storage medium, wherein the monolayer comprises at least one species of the ions of the one or more gasses, and wherein the monolayer is covalently bound to carbon atoms of the protective carbon overcoat.

2. The method according to claim 1, further comprising injecting a carrier gas into the ionization source.

3. The method according to claim 1, wherein the one or more gasses may have pressures of milliTorrs.

4. The method according to claim 1, wherein the one or more gasses may have flow rates between approximately 1 standard cubic centimeter per minute (sccm) and approximately 10 sccm.

5. The method according to claim 1, wherein the ionization source is a radio-frequency inductive plasma source, a radio-frequency capacitive plasma source, a direct current (DC) arc plasma source, a hollow cathode plasma source, a microwave plasma source, or an electron cyclotron resonance (ECR) plasma source.

6. The method according to claim 1, wherein the ionization source is an electron cyclotron resonance (ECR) plasma source.

7. The method according to claim 1, wherein the ionization source is a microwave plasma source.

8. The method according to claim 1, wherein the ionization source has a beam current between approximately 10 milliamps (mA) and approximately 100 mA; and the beam voltage may be between approximately 100 electron volts (eV) and approximately 2,000 eV.

9. The method according to claim 1, wherein the monolayer comprises a thickness between approximately 0.9 Å and approximately 5.0 Å.

10. The method according to claim 1, further comprising placing a shield between the ionization source and the magnetic data storage medium.

11. The method according to claim 10, wherein the shield comprises a metal plate.

12. The method according to claim 1, wherein the surface of the protective carbon overcoat comprises a (100) plane of carbon atoms.

13. A method comprising:
    injecting one or more gasses into an ionization source, wherein the one or more gasses are selected from: hydrogen ($H_2$), nitrogen ($N_2$), oxygen ($O_2$), or combinations thereof, and one or more carrier gases;
    placing a shield between the ionization source and the magnetic data storage medium;
    ionizing the one or more gasses in the ionization source to form ions of the one or more gasses; and
    depositing a monolayer on a surface of a protective carbon overcoat of a magnetic data storage medium, wherein the monolayer comprises at least one species of ions of the one or more gasses, and wherein the monolayer is covalently bound to carbon atoms of the protective carbon overcoat.

14. The method according to claim 13, wherein the ionization source is an electron cyclotron resonance (ECR) plasma source.

15. The method according to claim 13, wherein the ionization source is a microwave plasma source.

16. The method according to claim 13, wherein the shield comprises a metal plate.

17. A method comprising:
    injecting one or more gasses into an ionization source, wherein the one or more gasses comprise hydrogen ($H_2$), and one or more carrier gases;
    placing a shield between the ionization source and the magnetic data storage medium;
    ionizing the one or more gasses in the ionization source to form ions of the one or more gasses; and
    depositing a monolayer on a surface of a protective carbon overcoat of a magnetic data storage medium, wherein the monolayer comprises species of ions of the at least one of the one or more gasses, and wherein the monolayer is covalently bound to carbon atoms of the protective carbon overcoat.

* * * * *